(12) United States Patent
Kaminsky et al.

(10) Patent No.: US 7,980,457 B2
(45) Date of Patent: Jul. 19, 2011

(54) AUTOMATED TRADING EXCHANGE SYSTEM HAVING INTEGRATED QUOTE RISK MONITORING AND INTEGRATED QUOTE MODIFICATION SERVICES

(75) Inventors: Ross G. Kaminsky, Chicago, IL (US); Richard A. Angell, Evanston, IL (US); Gordon D. Evora, Chicago, IL (US)

(73) Assignee: Chicago Board Options Exchange, Incorporated, Chicago, IL (US)

( * ) Notice: Subject to any disclaimer, the term of this patent is extended or adjusted under 35 U.S.C. 154(b) by 427 days.

(21) Appl. No.: 12/035,996

(22) Filed: Feb. 22, 2008

(65) Prior Publication Data

US 2008/0208734 A1 Aug. 28, 2008

Related U.S. Application Data

(63) Continuation of application No. 09/475,534, filed on Dec. 30, 1999, now Pat. No. 7,356,498.

(51) Int. Cl.
*G06F 17/00* (2006.01)
*G06Q 40/00* (2006.01)
(52) U.S. Cl. .......................... 235/375; 705/36 R; 705/38
(58) Field of Classification Search .................. 235/375, 235/376, 380, 385; 705/35, 36 R, 37, 38, 705/39, 40, 41
See application file for complete search history.

(56) References Cited

U.S. PATENT DOCUMENTS 4,674,044 A 6/1987 Kalmus et al.
(Continued)

FOREIGN PATENT DOCUMENTS

JP 3-68067 A 3/1991
(Continued)

OTHER PUBLICATIONS

Biais et al., "An Emperical Analysis of the Limit Order Book and the Order Flow in the Paris Bourse," Dec. 1995, Journal of Finance, vol. 50, No. 5, pp. 1655-1690.

(Continued)

*Primary Examiner* — Andrew Joseph Rudy
(74) *Attorney, Agent, or Firm* — Brinks Hofer Gilson & Lione

(57) ABSTRACT

An automated trading exchange having integrated quote risk monitoring and quote modification services. An apparatus is implemented using at least one computer, having memory, and a processor. The computer is configured to receive orders and quotes, wherein specified ones of the quotes are contained in a quote group, and have associated trading parameters such as a risk threshold. Not all received quotes are required to have trading parameters as described herein. Preferably, the quote group contains all the quotes, or a subset of quotes, belonging to an individual market-maker for a given class of options contracts, or possibly the quotes of two or more market-makers that have identified themselves as belonging to a group for the purposes of risk monitoring and quote modification. The computer typically generates a trade by matching the received orders and quotes to previously received orders and quotes, and otherwise stores each of the received orders and quotes if a trade is not generated. The computer then determines whether a quote within the quote group has been filled as a result of the generated trade, and if so, determines a risk level and an aggregate risk level associated with said trade. The computer then compares the aggregate risk level with the market-maker's risk threshold, and if the threshold is exceeded, automatically modifies at least one of the remaining quotes in the quote group. The computer may also automatically regenerate quotes that have been filled.

7 Claims, 7 Drawing Sheets

U.S. PATENT DOCUMENTS

| | | | |
|---|---|---|---|
| 4,903,201 | A | 2/1990 | Wagner |
| 4,980,826 | A | 12/1990 | Wagner |
| 5,038,284 | A | 8/1991 | Kramer |
| 5,101,353 | A | 3/1992 | Lupien et al. |
| 5,136,501 | A | 8/1992 | Silverman et al. |
| 5,297,031 | A | 3/1994 | Gutterman et al. |
| 5,305,200 | A | 4/1994 | Hartheimer et al. |
| 5,689,652 | A | 11/1997 | Lupien et al. |
| 5,732,400 | A | 3/1998 | Mandler et al. |
| 5,774,877 | A | 6/1998 | Patterson, Jr. et al. |
| 5,793,301 | A | 8/1998 | Patterson, Jr. et al. |
| 5,797,002 | A | 8/1998 | Patterson, Jr. et al. |
| 5,809,483 | A | 9/1998 | Broka et al. |
| 5,819,237 | A | 10/1998 | Garman |
| 5,845,266 | A | 12/1998 | Lupien et al. |
| 5,873,071 | A | 2/1999 | Ferstenberg et al. |
| 5,913,202 | A | 6/1999 | Motoyama |
| 5,915,209 | A | 6/1999 | Lawrence |
| 5,915,245 | A | 6/1999 | Patterson, Jr. et al. |
| 5,924,082 | A | 7/1999 | Silverman et al. |
| 5,950,176 | A | 9/1999 | Keiser et al. |
| 5,950,177 | A | 9/1999 | Lupien et al. |
| 5,963,923 | A | 10/1999 | Garber |
| 5,978,780 | A * | 11/1999 | Watson ........................ 705/40 |
| 6,012,046 | A | 1/2000 | Lupien et al. |
| 6,014,643 | A | 1/2000 | Minton |
| 6,016,483 | A | 1/2000 | Rickard et al. |
| 6,021,397 | A * | 2/2000 | Jones et al. ................ 705/36 R |
| 6,029,154 | A * | 2/2000 | Pettitt .............................. 705/44 |
| 6,085,169 | A | 7/2000 | Walker et al. |
| 6,098,051 | A | 8/2000 | Lupien et al. |
| 6,112,189 | A | 8/2000 | Rickard et al. |
| 6,119,103 | A * | 9/2000 | Basch et al. .................... 705/35 |
| 6,119,596 | A | 9/2000 | Fletcher et al. |
| 6,131,087 | A | 10/2000 | Luke et al. |
| 6,173,270 | B1 | 1/2001 | Cristofich et al. |
| 6,192,354 | B1 | 2/2001 | Bigus et al. |
| 6,195,647 | B1 | 2/2001 | Martyn et al. |
| 6,199,050 | B1 | 3/2001 | Alaia et al. |
| 6,263,321 | B1 | 7/2001 | Daughtery, III |
| 6,269,346 | B1 | 7/2001 | Cristofich et al. |
| 6,278,982 | B1 | 8/2001 | Korhammer et al. |
| 6,282,521 | B1 | 8/2001 | Howorka |
| 6,285,989 | B1 | 9/2001 | Shoham |
| 6,311,166 | B1 * | 10/2001 | Nado et al. ...................... 705/30 |
| 6,317,727 | B1 | 11/2001 | May |
| 6,317,728 | B1 | 11/2001 | Kane |
| 6,321,212 | B1 | 11/2001 | Lange |
| 6,360,210 | B1 | 3/2002 | Wallman |
| 6,405,180 | B2 | 6/2002 | Tilfors et al. |
| 6,493,682 | B1 * | 12/2002 | Horrigan et al. ............ 705/36 R |
| 6,539,362 | B1 | 3/2003 | Patterson et al. |
| 6,564,192 | B1 | 5/2003 | Kinney et al. |
| 6,602,627 | B2 | 8/2003 | Kasai et al. |
| 6,618,707 | B1 | 9/2003 | Gary |
| 6,647,374 | B2 | 11/2003 | Kansal |
| 6,658,393 | B1 * | 12/2003 | Basch et al. .................... 705/38 |
| 6,850,643 | B1 | 2/2005 | Smith et al. |
| 6,937,990 | B1 | 8/2005 | Walker et al. |
| 7,209,896 | B1 | 4/2007 | Serkin et al. |
| 7,219,080 | B1 | 5/2007 | Wagoner et al. |
| 7,249,080 | B1 * | 7/2007 | Hoffman et al. ............ 705/36 R |
| 7,251,629 | B1 | 7/2007 | Marynowski et al. |
| 7,403,922 | B1 * | 7/2008 | Lewis et al. .................... 705/38 |
| 7,523,194 | B2 * | 4/2009 | Strohwig et al. ............. 709/224 |

FOREIGN PATENT DOCUMENTS

| | | |
|---|---|---|
| JP | 6-236383 A | 8/1994 |
| JP | 9-81640 A | 3/1997 |
| JP | 11-259559 A | 9/1999 |
| WO | 98/12659 A1 | 3/1998 |
| WO | WO 00/28449 | 5/2000 |
| WO | WO 00/48053 | 8/2000 |
| WO | WO 00/70506 | 11/2000 |
| WO | WO 01/22263 | 3/2001 |
| WO | WO 01/22269 | 3/2001 |
| WO | WO 01/22313 | 3/2001 |
| WO | WO 01/22315 | 3/2001 |
| WO | WO 01/22332 | 3/2001 |
| WO | WO 01/88808 | 11/2001 |
| WO | WO 01/98959 | 12/2001 |
| WO | WO 01/98962 | 12/2001 |
| WO | WO 01/98965 | 12/2001 |

OTHER PUBLICATIONS

Examiner's first report on Australian patent application No. 22765/01, dated Nov. 20, 2002 (1 page).

Notice of Reasons for Refusal issued in Japanese patent application No. 2001-550665, dispatch date: Aug. 24, 2004 (18 page).

Decision on Refusal issued in Japanese patent application No. 2001-550665, dispatch date: Dec. 6, 2005 (5 pages).

Australian Patent Office Search Report issued in Singapore patent application No. SG 200105226-5, mailed Mar. 30, 2006 (4 pages).

Australian Patent Office Examination Report issued in Singapore patent application No. SG 200105226-5, mailed Mar. 30, 2006 (4 pages).

Summons to Attend Oral Proceedings issued in European patent application No. 00986543.7, dated Jan. 20, 2009 (5 pages).

* cited by examiner

US 7,980,457 B2

AUTOMATED TRADING EXCHANGE SYSTEM HAVING INTEGRATED QUOTE RISK MONITORING AND INTEGRATED QUOTE MODIFICATION SERVICES

CROSS-REFERENCE TO RELATED APPLICATION

This application is a continuation of U.S. application Ser. No. 09/475,534, filed Dec. 30, 1999, now U.S. Pat. No. 7,356,498, the entirety of which is incorporated herein by reference.

A. FIELD OF THE INVENTION

The present invention relates to financial trading systems. More specifically, it is directed to a method and device for market-maker risk management through automatic quote risk monitoring and quote modification in an automated trading system.

B. DESCRIPTION OF THE RELATED ART

1. Option Trading

Option contracts are traded publicly on many exchanges throughout the world. These securities, referred to generally as "options," convey certain rights to buy or sell an underlying stock, commodity, or other security at a fixed price for a specific period of time—until expiration for an American-style option or at expiration for a European-style option. All option contracts that trade on U.S. securities exchanges are issued, guaranteed and cleared by the Options Clearing Corporation (OCC). OCC is a registered clearing corporation with the SEC.

The potential loss to the buyer of an option can be no greater than the initial premium paid for the contract, regardless of the performance of the underlying stock. This allows an investor to control the amount of risk assumed. On the contrary, the seller of the option, in return for the premium received from the buyer, assumes the risk of being assigned the obligation to buy or sell the underlying security if the contract is exercised. Therefore, writing options can lead to large potential exposure.

Further background information may be obtained from the book "OPTIONS, Special Concepts and Trading Strategies," The Options Institute, The Educational Division of the Chicago Board Options Exchange, Second Edition, McGraw Hill (1995), the contents of which are incorporated herein by reference.

2. Open Outcry Trading and Automated Exchanges

Many trading systems utilize what is known as an open outcry method of trading. In the open outcry system, market-makers are required to make a two-sided market by providing a bid and offer quote in all option series. The market-makers typically communicate verbally or visually with contra traders indicating their willingness to buy and sell various quantities of securities. Because the market-makers have personal control over the types and number of contracts traded, they can adjust their trading strategies as their positions change. In this way, the market-makers can manage their exposure, or risk, associated with their holdings by adjusting their quotes to favor trades that would tend to hedge away unwanted exposure.

In an automated trading environment, a certain amount of control is lost when a market-maker has issued quotes in a large number of option series. The quotes are typically recorded in the automated and computer-based trading system, and matched up automatically with orders that enter the system electronically. With the proliferation of computer trading systems and increased communication speeds, the rate at which trades may be executed by an automated system far surpass the rate of trades that occur in an open outcry system. The speeds are such that the rapidity of trades may exceed the market-maker's ability to adapt his or her position. Specifically, one disadvantage of automated trading systems is that a number Of automatic trades may occur within a very short time that result in an unacceptable risk being assumed by a market-maker. That is, the trades may occur so rapidly that the market-maker is unable to withdraw or modify his quotes in a timely manner.

There exist software tools that can analyze stock and option portfolios in close to real time. Market data is provided to the software analysis tools and used to evaluate the risk associated with stock and option portfolios. In addition, the tools may provide recommendations for trades and quotes and automated submission of those trades and quotes. However, even if a market-maker utilizes such a computer-implemented automated position analysis tool to revise or cancel quotes, the software tools may be unable to act in time given the speed at which an automated trading exchange system is capable of executing incoming orders. In particular, one aspect of existing exchange systems is that transactions are received and processed in the order received. Thus, even if a market-maker responds immediately using an automated software tool, the exchange may have a message queue containing additional orders that will be processed before the exchange system receives and processes the market-maker's quote cancellation request.

The result is that a market-maker who is willing to take on a predetermined level of risk must limit the number of quotes or the depth (quantity) of each quote to ensure that rapid trades do not result in an unacceptable aggregate risk, rather than issuing quotes having greater depth and breadth (where the filling of a single quote might reach the market-maker's risk limit). Thus, a market-maker's limited control over risk management may have the undesirable effect of hindering the liquidity of the market.

It would therefore be desirable to have a trading exchange system and method for automatically canceling, regenerating, or modifying quotes under certain trading conditions.

SUMMARY OF THE INVENTION

A method and apparatus for an automated trading exchange having integrated quote risk monitoring and quote modification services is provided. In accordance with a first aspect of the invention, an apparatus is implemented using at least one computer, having memory, a processor, and a communication port. The computer is configured to receive orders and quotes, wherein specified ones of the quotes are contained in a quote group, and have associated trading parameters such as a risk threshold. Note that not all received quotes are required to have trading parameters as described herein. Preferably, the quote group contains all the quotes belonging to an individual market-maker for a given class of options contracts, or possibly the quotes of two or more market-makers that have identified themselves as belonging to a group for the purposes of risk monitoring and quote modification. The computer typically generates a trade by matching the received orders and quotes to previously received orders and quotes, and otherwise stores each of the received orders and quotes if a trade is not generated. The computer then determines whether a quote within the quote group has been filled as a result of the generated trade, and if so, determines a risk level and an aggregate risk level associated with said trade. The computer then compares the aggregate risk level with the market-maker's risk threshold, and if the threshold is exceeded, automatically modifies at least one of the remaining quotes in the quote group. The computer may also automatically regenerate quotes, that is, automatically issue new quotes when trades have occurred against previous quotes.

BRIEF DESCRIPTION OF THE DRAWINGS

The objects, features and advantages of the present invention will be more readily appreciated upon reference to the following disclosure when considered in conjunction with the accompanying drawings, in which.

DETAILED DESCRIPTION OF THE PRESENTLY PREFERRED EMBODIMENT(S)

Figure 1:
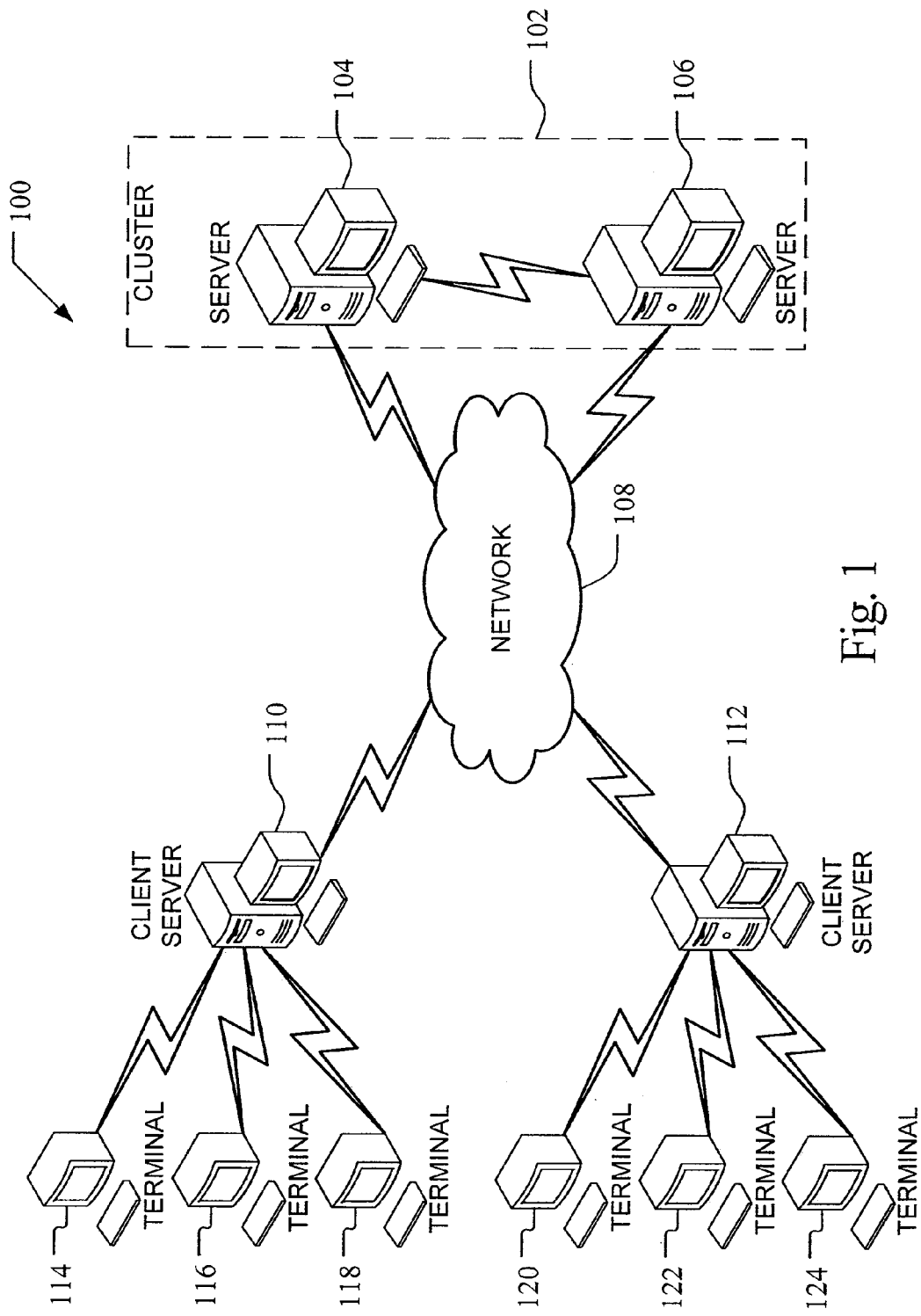
FIG. 1 depicts a preferred embodiment of the quote modification trading system.

With reference to FIG. 1, a preferred embodiment of the system 100 utilized for trading and quote modification is described. The system 100 (also referred to herein as a screen-based trading system, or SBT system) includes a plurality of computers, which may be one or more workstations, servers, mainframes, or other computer hardware platforms that provide sufficient resources to meet the desired trading volume and desired transaction-processing rate. In the preferred embodiment shown in FIG. 1, the system includes a number of computer clusters such as cluster 102 (although only one is depicted in FIG. 1), where each cluster 102 handles trading for a number of securities, such as one or more classes of options. In the preferred embodiment, each cluster 102 is made up of two servers 104, 106. The servers 104, 106 are preferably multiprocessor SUN 4500 servers available from SUN Microsystems of Palo Alto, Calif. SUN Enterprise™ servers or Starfire™ servers are a preferable alternative.

The servers 104 and 106 in cluster 102 communicate with a plurality of client servers 110, 112 that are typically located at remote locations, such as at a brokerage house, but may also be located in the same facility as the clusters 102. Network 108 facilitates communication between the clusters 102 and the client servers 110, 112. The network 108 is preferably a private LAN/WAN configuration, but a public network may be utilized, provided sufficient redundancies and message security are provided. Two such client servers 110, 112 are shown in FIG. 1. Each client server 110, 112 may be provided with a predetermined message throughput rate into network 108, where the throughput rate may be a maximum rate determined by various parameters, including the volume of orders sent by the client server 110, 112, the volume of quotes sent by the client server 110, 112, the number of option series for which quotes are provided, communication/connection fees paid by the brokerage house or other entity utilizing the client server 110, 112, the overall capacity of the trading system 100, etc. The client servers 110, 112 preferably communicate with other elements of the automated exchange system using a client application server module 210, as further described below, running on client servers 110, 112.

Each client server 110, 112 is capable of serving a number of clients, shown as terminals 114, 116, 118, 120, 122, and 124 in FIG. 1. The client terminals 114-124 may be "dumb" terminals, stand alone computing devices (PCs or workstations), or even portable wireless terminals. The client servers 110, 112 may communicate with the client terminals 114-124 using a proprietary protocol or one of many standard public domain protocols. The client servers 110, 112 may include a web server or connect to a separate web server for processing tcp/ip, http, html, java, and the like, and provide access to client terminals 114-124 over the Internet in addition to (or as an alternative to) private LAN/WAN or Virtual Private Network access. For embodiments that include a webserver, the web server preferably utilizes common gateway interface scripts (cgi) to interface with the client application server 210. In addition to cgi scripts, or as an alternative to cgi, other web server interfaces and server extensions may be utilized to provide communication between the web server and the application server 210. The client servers 110, 112 communicate with the users of terminals 114-124 by way of secure Internet communication protocols or by private LAN/WAN or VPN communication links. Thus the client terminals 114-124 may run dedicated proprietary software to communicate with the client server 110, 112, or may interface with client servers 110, 112 via a standard web browser. The web browser may operate using built-in java scripts, or may also include specialized browser modules that are provided to the client terminals.

Figure 2A:
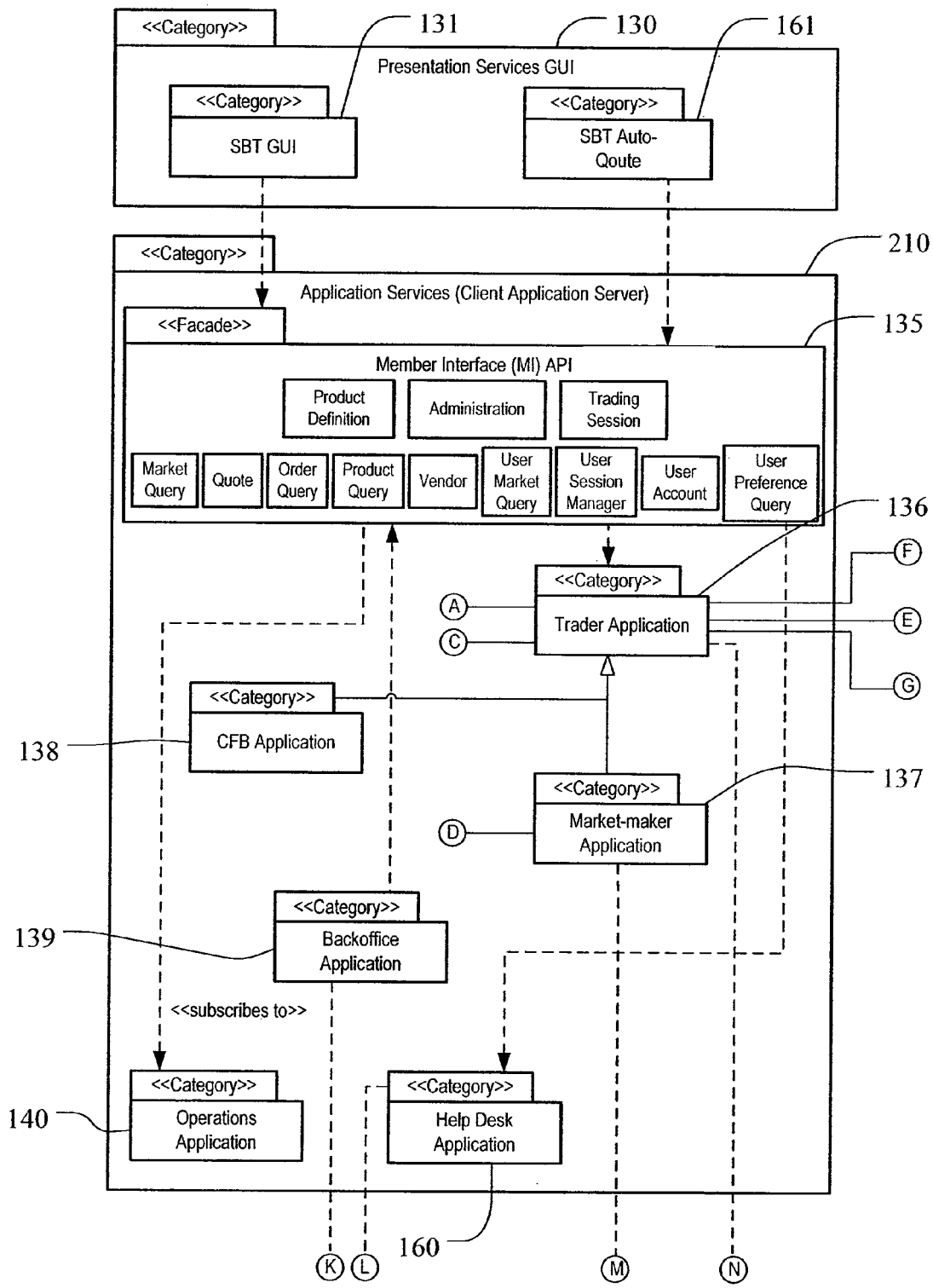
FIGS. 2A, 2B, 2C, and 2D show the interconnection of various software modules associated with the quote risk monitoring and modification trading system.
Figure 2B:
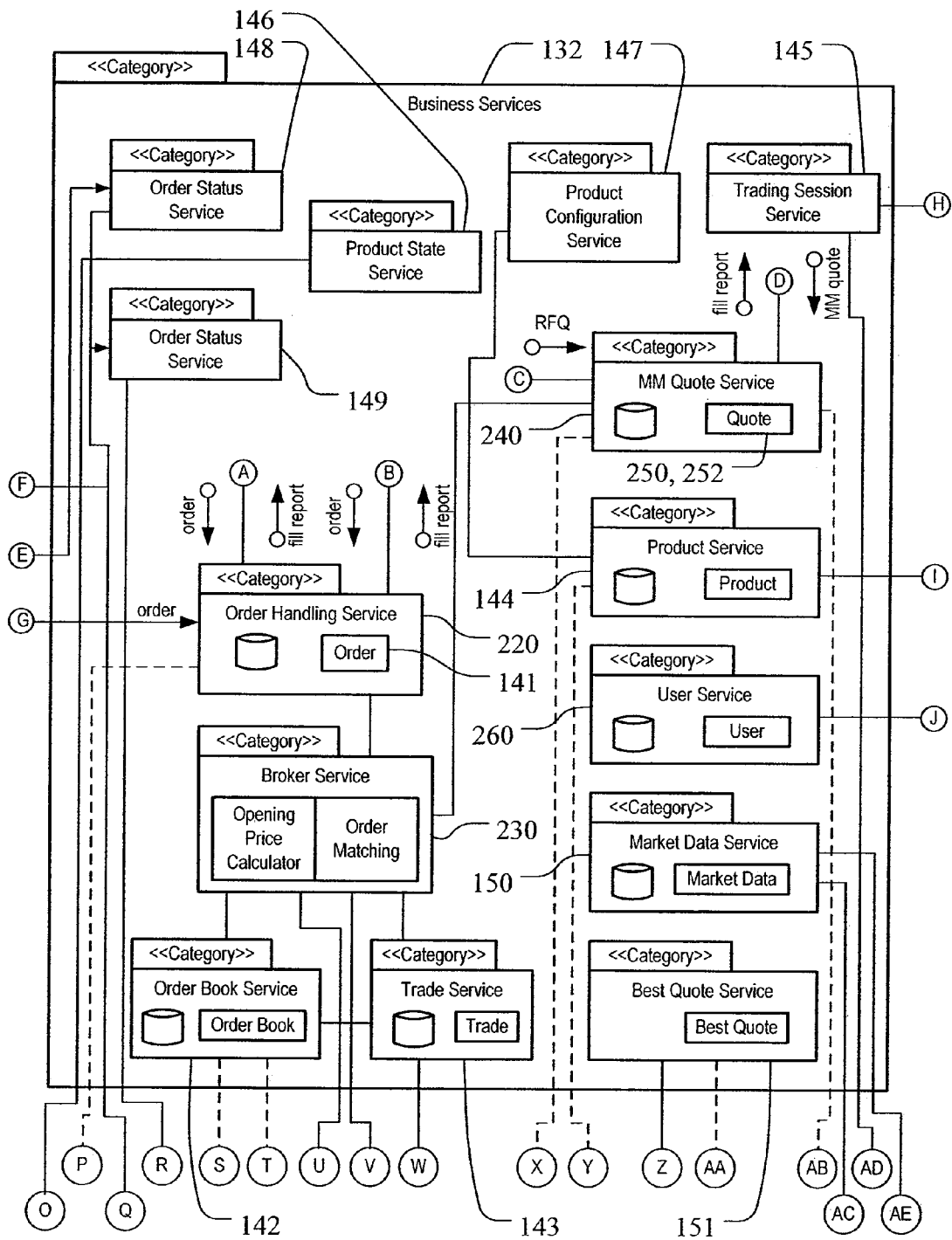

The automated exchange system 100 is comprised of the following five logical software modules: Presentation Services Graphical User Interface (GUI) 130 (FIG. 2A); Application Services 210 (Client Application Server, Gateway) (FIG. 2A); Business Services 132 (FIG. 2B); External Integration Services 133 (FIG. 2C); and, Infrastructure Services 134 (FIG. 2D).

With reference to FIG. 2A, the Presentation Services GUI module 130 is constituted by applications that interact with the exchange system 100 via the Member Interface (MI) API 135. There are two types of client applications, those that provide a GUI to allow user interaction with the system directly and applications that automate trading functions.

An SBT (screen-based trading) GUI module 131 is responsible for displaying the contents of a particular model to the screen and updating the display if the model's contents change. This module 131 contains several GUI applications, one for each of the major classes of human actors that use the system 100: traders, market-makers, clearing firm brokers, and system operators. The Trader GUI is used by regular traders. It consists of several GUI's for displaying and entering orders, and market data. The Market-Maker GUI is an extension of the Trader GUI and is used by market-makers. It consists of several GUI's for displaying and entering orders, quotes, and market data. The Clearing Firm Broker GUI is an extension of the Trader GUI and used by clearing firm brokers. It consists of several GUI's for forcing the logout of a market-maker and for setting a maximum order quantity for the quotes and orders of the clearing firm's market-makers. The system operation GUI is used by system operators and help desk operators. The autoquote system 161 runs on the market-maker's work station and is used by the market-maker to generate quotes for various option series.

The Application Services module 210 contains subordinate modules that forward requests initiated by human or automated actors, to be executed by the appropriate Business Services module(s) 132. These applications submit requests to Business Services components 132, notify clients of business events, and maintain user-specific views of information in the Business Services 132. This module also encompasses a Member Interface (MI) API 135 that provides a single entry point to the system exposing the applications in the Application Services Module 210 (i.e., Trader, Market-Maker). In addition, the Application Services Module 210 maintains instantaneously updated views that reflect the prevailing state of each actor's information in the Business Services module 132.

The Trader Application module 136 has the following specific responsibilities: submit, cancel, update, and cancel/replace orders; submit requests for quotes; present the current status of the trader's orders; present fill and cancel reports; present Market Best Bids and Offers for selected products; set the trader's defaults and preferences; present Book Depths for selected products; and, present underlying quotes/last sales and news alerts.

The Market-Maker module 137 inherits the Trader App module's 136 responsibilities and adds the following: submit and modify market-maker quotes; present requests for quotes; set the market-maker's defaults and parameters; set autoquote parameters; submit autoquotes.

The Clearing Firm Broker module 138 inherits the Trader App module's 136 responsibilities and adds the following: assume control of a trader's privileges. A Clearing Firm Broker can force the logout of a market-maker; set a maximum order quantity for quotes and orders of the clearing firm's market-makers.

The BackOffice application 139 is responsible for reporting order status information. This can include fill reports, cancel reports and new order notifications. The Operations application 140 has the following responsibilities: start and shutdown the SBT system; start and stop trading of a product; change the status of a product's market (pre-open, open, close, halt, etc.); present logged system events; maintain SBT-specific trader information; maintain SBT-specific product information; maintain trading parameters (quote width, minimum market-maker order default size, required percent of responses to a request for quote (RFQ), maximum response time to an RFQ; etc).

The functionality of the Trader 136, Market-Maker 137, Clearing Firm Broker 138, and Back Office 139 modules is exposed by a facade, the Member Interface (MI) Application Programming Interface (API) 135. The Member Interface 135 exposes different subsets of functionality depending on the user that logged on to the system. The intention behind sharing a common API among the different trader classes is to allow workstations to service all of them. Separate API's may alternatively be used for the different user classes.

The Member Interface API 135 supports both SBT client applications and external applications owned by members. Members use the Member Interface API to link their existing computer systems to the exchange system 100, to submit orders electronically and to automate trading. Likewise, market-makers use the API to submit autoquotes employing their proprietary systems, instead of the default autoquote application 161 provided by SBT.

The following system functions are preferably accessible through the API: session logon and logoff; market state inquiry and change notification; connection status inquiry and change notification; order entry, cancellation, and replacement; quote entry, cancellation, and replacement; RFQ notification; order status inquiry and fill notification; subscription to product markets; best market quotes notification; book "depth" inquire and change notification.

Referring now to FIG. 2B, the Business Services module 132 contains the core functionality of the automated exchange system 100. It includes components that correspond to the key business object model entities of the automated trading system such as members, orders, books, products, quotes, et cetera. In addition, it includes components to administer and operate the system 100.

The Order Handling Service module 220 maintains the current state of all orders persistently. Specific operations may be exposed directly by Order objects 141, bypassing the Order Handling Service 220. Logically, Orders are components of this module. Specifically, the Order Handing Service 220 and Order components are responsible for: receiving and storing incoming orders (from SBT clients or TPF 156(FIG. 2C)); forwarding incoming orders to the Broker module for execution; receiving order state change notifications from the Broker and Order Book modules and updating stored orders with this information (the functionality is provided by exposing Orders, allowing the Broker and Order Book components to directly update the orders); sending fill reports to originating traders upon receiving fill notifications from the Broker and Order Book modules; receiving order cancellation requests and forwarding them to the Broker and Order Book modules (upon confirmation of a cancellation, notifying the originating trader of the result of the request and updating the stored state of the order); and receiving order cancellation/replacement requests and forwarding them to the Broker and Order Book modules (upon confirmation of the cancellation/replacement, notifying the originating trader of the result of the request and updating the stored state of the order).

The Broker Service module 230 is responsible for executing the following types of orders: limit, market, all or none, fill or kill, immediate or cancel, stop, stop limit, and spread. Upon trade execution, the Broker Service 230 is responsible for notifying the Trade Service module 143 of all the orders matched (all parties to the trade) in the trade. It is also responsible for notifying the Order Handling Service (i.e. Orders) 220 and Market-Maker Quote Service (i.e. Quotes) 240 of the fills.

The responsibilities of the Order Book Service module 142 are: cooperate with the Broker Service 230 in calculating the opening price during a product's pre-opening period; acknowledge that an order was accepted by publishing an event consumed by the Trader application 136 which originated the order; cancel and cancel/replace resting orders; upon changes to the top of the book, publish the new Book Best Bid Offer (BBBO) and last sale.

The responsibilities of the Trade Service module 143 are: receive trade notifications from the Broker Service 230; format trade reports; store trade reports; and forward trade reports to trade match (via TPF 156).

The Market-Maker (MM) Quote Service module 240 is responsible for: receiving requests for quotes (RFQs) from traders; submitting RFQs to market-makers assigned to the product for which the quote was requested (by publishing in the RFQ event channel); receiving and logging market-maker responses to RFQs (market-maker quotes); upon receiving a market-maker quote, saving it persistently and submitting them to the Broker Service module 230 for execution; sending fill reports to originating market-makers upon receiving fill notifications from the Broker and Order Book modules; canceling or updating a Market-Maker quote upon receiving a request from the originating market-maker by submitting the request to the Broker/Order Book; canceling or updating or regenerating Market-Maker quotes upon receiving a fill report; upon inquiry, providing the history of the quotes submitted by a market-maker.

The Product Service module 144 maintains all product-related information. In order to perform its responsibilities, the Product Service module 144 downloads, and preferably caches, product information from TPF 156 and TIPS 157. The User Service module 260 maintains all user-related information, both specific to SBT and contained in the Membership System. It provides a unified interface to SBT components accessing user information, hiding the actual location of the maintained data, thus simplifying client logic.

The User Service module 260 maintains the information of traders, market-makers, clearing firm brokers, operators, help desk personnel, back-office personnel. In one embodiment, the data is cached for performance reasons and the data is synchronized from the TPF 156 source.

The Trading Session Service module 145 maintains all business day and trading session-related information and manages the different states of a trading session, e.g. open, closed, and halted. Products that are processed/traded in each trading session are also kept at this service. In order to perform these responsibilities, the Product Service module 144 downloads trading session and product information from TPF 156, as well as monitor events that affect products traded within a session.

The Product State Service 146 is responsible for coordinating product state changes for all products, e.g. pre-opening, opening, trading; halting, closing, and post-closing. It works closely with the Broker Service 230 to insure that state changes occur in a timely fashion. The service 146 monitors events that affect products traded, such as monitoring the underlying market to detect when the primary exchange opens, closes or halts trading a product. The Product Configuration Service 147 is responsible for providing the location of where a product is processed/traded. This information is primarily used to route product-specific requests (e.g. orders) for processing. The Order Status Service 148 provides subscription and notification services related to orders (i.e., fill reports, cancel reports, order accepted by book, etc.).

The Quote Status Service module 149 provides subscription and notification services related to quotes (i.e. fill reports, deletion reports, etc.) The service 149 preferably replaces the use of event channels for quote status reporting, providing a more secure mechanism for status delivery. The Market Data Service 150 maintains a current snapshot of market data, in addition to publishing market summary data. The module also provides an interface to clients to query historical market data.

The Best Quote module 151 is responsible for calculating the market best (aggregate quantities of buy and sell orders at the best price) for each product and sending them to TPF 156 (which in turn forwards them to the Options Price Reporting Authority) for public dissemination. In addition, it is responsible for calculating and disseminating the National Best Bid Offer (NBBO). In order to provide this information, the Best Quote module 151 subscribes to the event channel referred to herein as the Best of the Rest channel to obtain the current best quote from competing exchanges. The Best Quote module 151 then determines the source of the NBBO, whether it is from the present exchange or a competitor, and publishes the results to the Best Quote event channel, of which the TPF Adapter 152 is a subscriber.

Figure 2C:
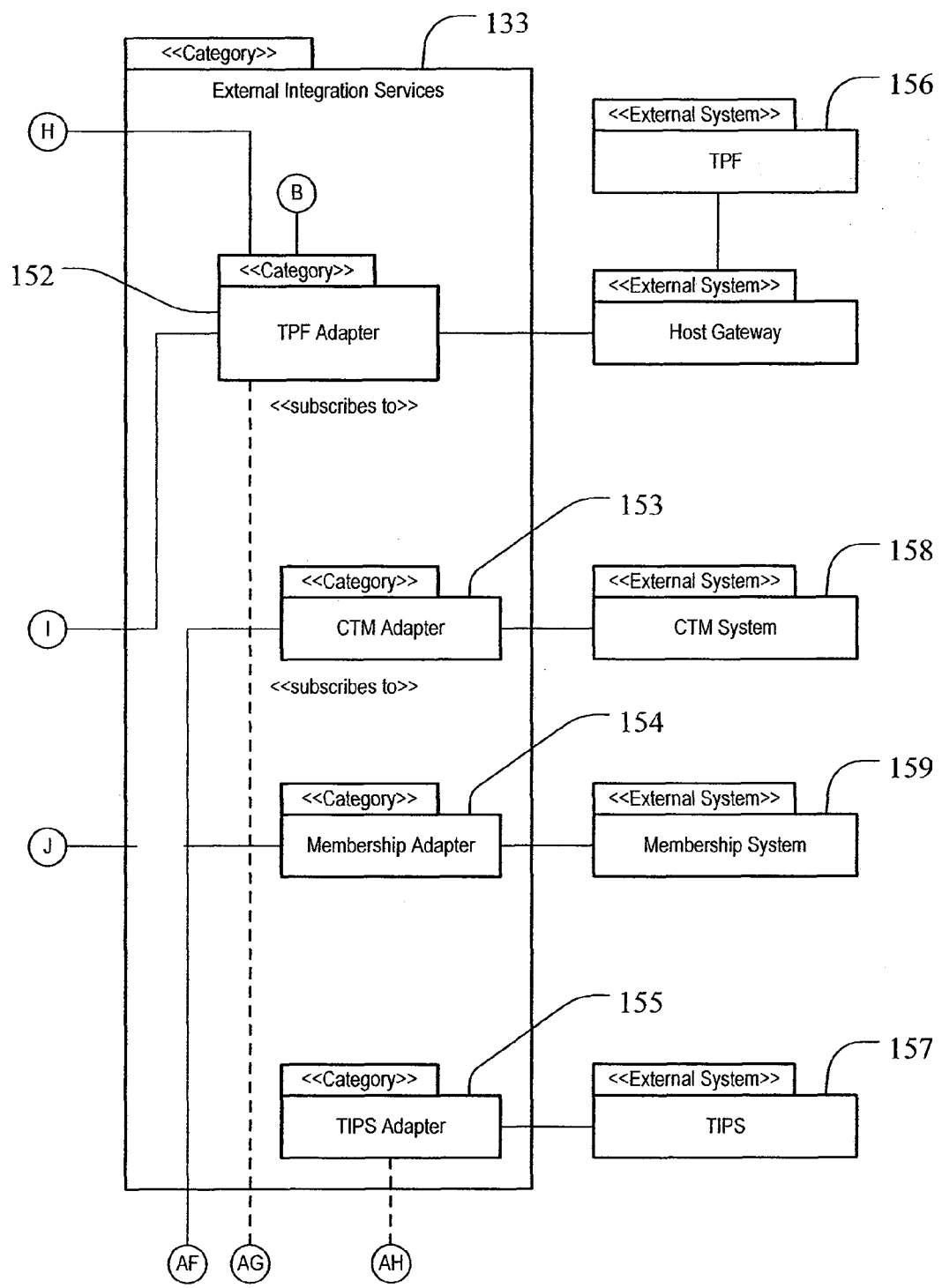
Figure 2D:
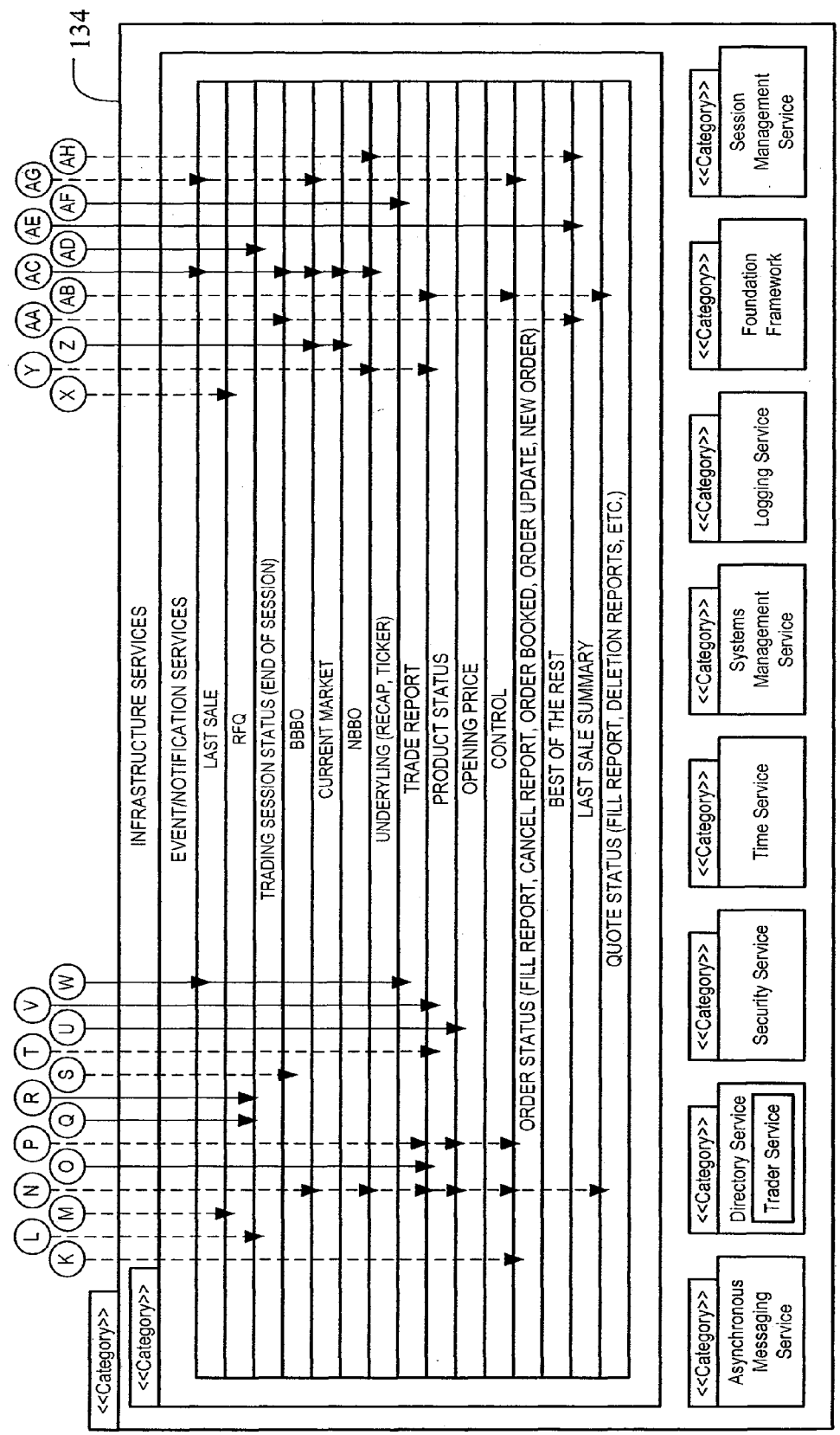

Referring now to FIG. 2C, the External Integration Services module 133 includes adapters 152, 153, 154, and 155, that map the interaction paradigms of external systems to the ones in the system 100 architecture. The adapter modules "adapt" (or "wrap") the native legacy interfaces to interfaces appropriate in the SBT environment. The TPF (Transaction Processing Facility) module 152 contains the adapter to allow SBT and TPF 156 to interact. TPF data is received, remodulated, and broadcast/delivered to the appropriate components within SBT. Conversely, SBT data is received, either through direct invocation or event consumption, remoduled, and sent to TPF 156 using its native interface.

The Membership Adapter 154 translates requests for member information received from SBT components into requests to the Membership System 159 and returns the results after reformatting.

The TIPS Adapter 155 subscribes to TIPS 157 to receive the external market data needed in the SBT environment, including underlying market data and the Best of the Rest of options listed in SBT. The Events Service (FIG. 2D) notifies the TIPS Adapter 155 of consumer subscriptions so that it can propagate these subscriptions back to TIPS 157. Once subscribed, the TIPS Adapter 155 reformats the market data received from TIPS 157 and publishes it for consumption by SBT components. Another responsibility of this adapter 155 is to publish underlying product state events when external markets change their states, for instance when they open, halt, close, etc.

The Trade Match Adapter 153 receives SBT data and forwards it to TM 158. The TM Adapter 153 handles the following data flows: Trade Report (SBT to TM)—SBT reports all the parties to a trade to TM 158.

Referring now to FIG. 2D, the Infrastructure Services module 134 contains commercial "off-the-shelf" software and extended infrastructure services that provide enterprise-wide support to various other external systems. One mechanism by which the SBT system components interact with each other is by supplying and consuming events, implemented as a publish/subscribe pattern. The following list provides a brief description of the event flows/notification services (messaging services) shown in FIG. 2D.

RFQ—the Market-maker (MM) Quote Service supplies RFQ events consumed by the Market-Maker Application.

BBBO—the Order Book supplies Book Best Bid Offer (BBBO) events consumed by the Best Quote Service.

NBBO—the Best Quote Service supplies National Best Bid Offer (NBBO) events consumed by the Trader Application, and Market Data Service.

Current Market—the Best Quote Service supplies Current Market Best events, containing a product's best quote, consumed by the Market Data Service and Trader Application. The best quote indicates if the exchange has the best quote.

Best of the Rest—the TIPS Adapter component supplies best-of-the-rest events consumed by the Best Quote Service.

Last Sale—the Trade Service supplies last sale events consumed by the Market Data Service 150 and TPF Adapter 152.

Last Sale Summary—the Market Data Service 150 component supplies last sale summary events consumed by the Trader application;

Logging—the Logging Service Proxy component supplies Log Service events consumed by the Log Service component.

System Management—the Foundation Framework supplies System Management events consumed by the System Management component.

Instrumentation—the Instrumentation Service component supplies Instrumentation events consumed by both the System Management component and the Log Service component.

Underlying Ticker—the TIPS Adapter supplies Underlying ticker events (prices, quotes, last sales, news alerts) consumed by the Trader Application and the Product Service.

Underlying Recap—the TIPS Adapter supplies Underlying summary events (high and low prices, volume) consumed by the Market Data Service and Trader Application.

Trade Report—the Trade Service supplies Trade Report events consumed by the TPF Adapter 152.

Product Status—the Product Service 144 and Product State Service 146 supply Product Status events (State, Price Adjustment, and Update) events consumed by the Trader application, Order Handling Service 220, and TPF Adapter 152.

Trading Session Status—the Trading Session Service 145 supplies Trading Session State events consumed by the Operations Application 140 and Help Desk application 160.

End of Session Summary—the Trading Session Service supplies End of Trading Session Status events.

Opening Price—The Broker Service module 230 supplies Opening Price events consumed by the Trader Application 136.

Control—the Operations 140 and Help Desk 160 applications supply Control events, possibly through the System Management component, consumed by Business Services 132 and External Integration Services 133 components.

Order Status—the Order Handling Service 220 (Order) supplies Fill Report, Cancel Report, Updated Order, New Order, and Order Accepted by Book events consumed by the Order Status Service 148, and TPF Adapter 152.

Quote Status—the MM Quote Service 240 (Quote) supply Fill Report, and Delete Report events consumed by the Quote Status Service 149.

In accordance with a preferred embodiment, there are four major tiers of the application software. The business services 132 handle all the SBT order matching, execution and reporting functionality. It provides the repository for all SBT information data. The application services 210 handle the application presentation and act as the application front end to the business services. Different views of the business services 132 and collaboration of business objects are grouped together and are presented to the user based on logon authentication and authorization level. The two tiers communicate to each other by two supported tiers: the infrastructure services 134 and external integration services 133. The infrastructure services 134 provide a seamless integration between the application services 210 and business services 132. The external integration services 133 provide the access to the external system.

Figure 3:
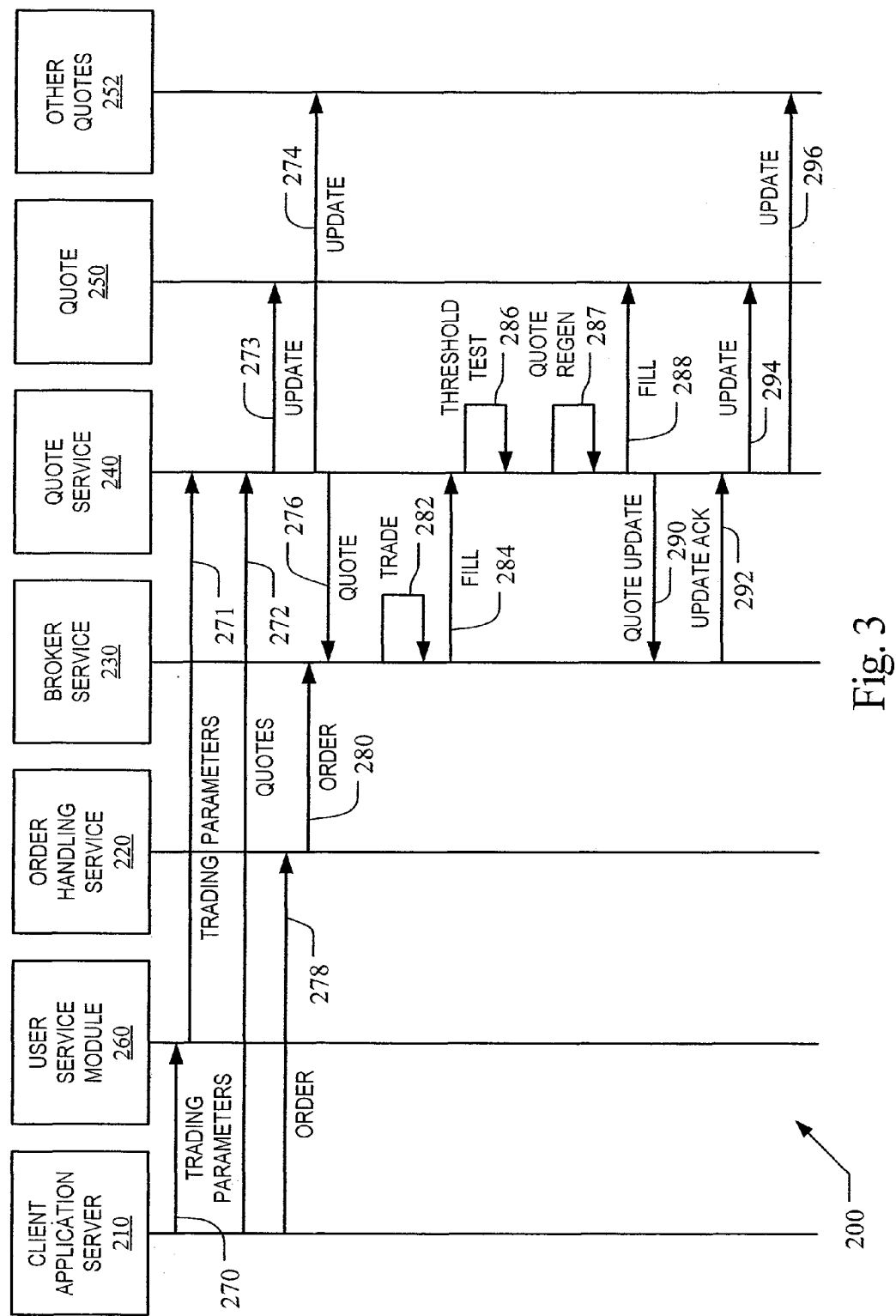
FIG. 3 shows a sequence diagram of a preferred embodiment of the quote modification system.

With reference to FIG. 3, a sequence diagram 200 for a preferred embodiment of the automated exchange system 100 is shown. The system 100 includes a client application server 210, an order handling service module 220, a broker service module 230, a quote service module 240, a user service module 260, and quote objects 250 and 252. The service modules 220, 230, 240, 260 and objects 250, 252 are preferably software modules running on clusters 102, or on one or more interconnected computers. The software modules are preferably written in an object-oriented programming language and are compiled to run on the clustered computers 102. Preferably, the software utilizes the C++ language, the Java programming language, or other object-oriented language. Alternatively, any suitable software language may be used to implement the system, as will be understood by one of ordinary skill in the art. The modules also interact with a database program used for storing data and other system and user information. In the preferred embodiment an Oracle database system is used.

The client application server 210, as discussed above, runs on client servers 110, 112, and provides an interface to one or more clients. The client server 110, 112 may include one or more application modules, depending upon the intended users of the servers 110, 112. For example, the client servers 110, 112 preferably include at least one of a market-maker application, a trader application, a back-office application, or a member interface. The client servers 110, 112 also preferably utilize a user authentication and role-based security model to control access to the various application modules.

The client server 110, 112 may also include modules such as a help desk application, an operations application, and a Clearing Firm Broker (CFB) module. The CFB module may be configured to allow a Clearing Firm to set maximum volume limits on a per-class basis. The Help Desk module is preferably enabled for use on client servers that provide connectivity to exchange management personnel. The Help Desk provides a utility to force a user to logout of the system.

The order handling service 220 forwards orders to the appropriate broker service module 230 that handles the class of options to which the individual orders relate. If the broker service module 230 cannot execute the order immediately, it routes it to the order book service module, which maintains the current state of all pending orders and quotes. The order handling service module 220 receives order information from various sources, including brokers, traders, market-makers, etc. The orders may enter the system from a client application server 210 or through an alternative interface such as TFP adapter 152, which is a connection that allows a pre-existing automated order handling system such as TPF system 156, to access the present system.

The broker service module 230 is responsible for executing various types of orders, including limit, market, all or none, fill or kill, immediate or cancel, stop, stop limit, and spread orders. Preferably, there are numerous broker service modules 230 running on the exchange server 104, or on the interconnected computers in the cluster 102, where each broker service module 230 handles trades for a subset of products offered by the exchange. For example, there is preferably a broker service module 230 for each class of option contracts. The broker service module 230 thus matches incoming orders to other orders or to quotes supplied by market-makers to complete a trade, indicated by line 282 in FIG. 3.

The broker service module 230 also receives quotes from the quote service 240, discussed below. The broker service module 230 attempts to execute a trade 282 by matching incoming quotes to orders or to other quotes stored by the order book service module 142 in the order book. Note that for purposes of trade execution 282, quotes are treated by the exchange system 100 as if they were orders. Thus, when the broker service module 230 receives a quote that it cannot match to an existing order or quote, it sends the quote to the order book for storage with other unfilled quotes and orders. Preferably, quotes differ from regular orders in that a quote may be two sided, having a bid and an offer price, and that each market-maker may only have one quote per product in the system.

To facilitate the order matching process of trade execution 282, the broker service module 230 has direct access to orders stored in the order book by the order book service module 142. Preferably, when the incoming order is matched to an existing quote supplied by the quote service module 240, the broker service module 230 provides the quote service module 240 with details of the trade.

The quote service module 240 manages the quotes supplied by market-makers via client application service module 210. The quote service module 240 submits the quotes to the broker service module 230 for execution. The quote service module 240 ensures that each individual market-maker has only one quote per product in the system at any given time. When a market-maker enters a new quote on a product for which he already has an outstanding quote, the quote service module preferably determines whether there is already an existing quote in the system for that market-maker and, if so, informs the broker service module 230 that the pre-existing quote is to be cancelled. The quote service module 240 submits the new quote to the broker service module 230 only after it has received acknowledgement from the broker service module 230 that the pre-existing quote has been cancelled.

The broker service module 230 issues fill reports to notify various other modules, and ultimately the trading entities, that the trade was executed. Upon notification of a fill 284 from the broker service module 230 (or the order book module), the quote service module 240 informs the quote object 250. In turn, the market-maker is notified of the fill via the exchange's reporting system. The quote service module 240 also cancels or updates a market-maker quote upon receiving a request from the originating market-maker by submitting the request to the broker service 230. The quote service module performs this by first informing broker service module 230 that the pre-existing quote has been cancelled. The broker service module 230 then removes the quote from the order book and confirms to the quote service 240 that the quote has been cancelled. The quote service 240 then submits the new quote (if one exists) to the broker service module 230.

With respect to FIG. 3, a preferred sequence of events and messages will be described. Market-Makers log into a client application server module 210 and access the user service module 260. The market-maker communicates with the user service module 260 through a terminal, such as a workstation or wireless handheld unit. As shown by line 270, trading parameters, or quote parameters, are sent to the user service module 260. Upon initialization of the quote service, or upon login of a new market-maker, various trading parameters are provided to the quote service module 240 as shown by line 271. The trading parameters may include a risk threshold, a quote regeneration indicator, a quote regeneration increment, a quote modification indicator, and a quote modification increment. The parameters may include numerous sets of thresholds, indicators, and increments, preferably one such set for each class for which the market-maker is providing quotes.

The quote service module 240 receives quotes from market-makers as shown by line 272, and provides these quotes to the quote objects 250, 252, as shown by update lines 273, 274, and to the broker service module 230 as shown by line 276. As mentioned above, the quote service module 240 will not forward updated quotes (as opposed to new quotes) to the broker service module 230 before first canceling old quotes.

Orders received by the client application server 210 are routed to the order handling service 220 as shown by line 278. The order is then forwarded to the appropriate broker service 230 as shown by line 280. The broker service module 230 attempts to execute every order or quote received with the best order (or quote) in the book as shown by line 282. When a trade is executed, a fill report is issued to the quote service module 240 as shown by line 284. The quote service module 240 then analyzes the trade and determines whether the market-maker's risk threshold has been exceeded, as shown by line 286. The threshold test will be described in further detail below. A fill report is sent to the quote object 250 as shown by line 288. The quote object 250 then informs market-maker of the fill through the use of a trade report service module (not shown).

In addition, at steps 286 and 287, the quote service module may modify quotes in response to the trade in accordance with the market-maker's trading parameters, as discussed below. The quote service module then reports the new quotes to the broker service module 230 as shown by line 290. The broker service 230 acknowledges the quote updates as shown by line 292. If the broker service 230 has already processed additional trades against the original quote, then the broker service module 230 would respond with a "too late to cancel" message. Once the update acknowledge has been received, the quote service module 240 updates the quote objects 250, 252, as shown by lines 294, 296. The quote objects then inform the market-maker that its quotes have been updated.

Risk Measurements and Risk Thresholds

In a preferred embodiment of the automated trading system 100 having integrated order modification and quote risk monitoring, the aggregate risk of a market-maker's recent trades is calculated after each trade. The measurement preferably includes either calculating an equivalent stock position, i.e., a net delta (by, for example, summing delta values for all contracts traded by the market-maker associated with the option series in the class), or calculating a net gamma, theta, or vega.

In particular, the aggregate risk measurement is preferably the net delta of all the trades for a specific market-maker or a designated group of market-makers in a given class in a given period of time. The quotes in a given class submitted by a market-maker (or a group of market-makers) are referred to herein as a quote group. The rules for delta calculations are as listed below:

Calls (delta value Δ is positive)
    Market-maker selling
    Market-maker position will be Negative Delta
    Market-maker buying
    Market-maker position will be Positive Delta Puts (delta value Δ is negative)
    Market-maker selling
    Market-maker position will be Positive Delta
    Market-maker buying
    Market-maker position will be Negative Delta The aggregate risk net delta is defined as:

$$\Delta_{NET} = \sum_i S_i \cdot \Delta_i \cdot U_i \cdot K_i, \tag{1}$$

which is the summation for i trades of the product of S, the sign of the trade, where S is positive when a market-maker buys and negative when a market-maker sells, Δ (delta), which is rate of change of the price of the individual series with respect to the stock, and ranges from −1.0 to 0 for puts and 0 to 1.0 for calls, U, which is the unit of trade, i.e. the number of shares, and K, the number of contracts traded by the market-maker.

The aggregate risk measurement is preferably based on the net delta $\Delta_{NET}$ for the entire class of options, which is the sum of all the deltas for a given market-maker's trades in all series of a class. The delta contribution for each trade is calculated every time a trade occurs for any series in the class. The aggregate risk is then calculated by summing delta contributions from only the most recent trades. The values for the theoretical deltas Δ, are preferably obtained by an autoquote system (not shown) associated with the exchange system 100, and more particularly with the business services package 132.

Autoquote systems provide pricing information, and specifically theoretical delta values $\Delta_i$, using well-known algorithms that utilize standard parameters, as is understood to those of skill in the art. Most of the parameters associated with calculating an individual series delta value are objective data, such as the date, strike price, the price of the underlying security, etc. Other autoquote parameters have acceptable default values that may be used, such as using the broker loan rate for the interest rate, etc. One parameter that may be more subjective among individual market-makers is the volatility parameter. Thus, the system 100 may be designed such that each quote submitted by a market-maker includes a volatility field to be used by the system in determining the individual theoretical delta value $\Delta_i$. The theoretical delta value $\Delta_i$ may then be calculated either as part of the threshold test, or may be periodically updated at a rate sufficient to provide a fairly accurate delta value $\Delta_i$. In this way, the system 100 provides the market-maker with further control over the quote risk monitoring system.

Because the exchange quote modification service is intended to address increased risks associated with a rapid sequence of trades, older trades need not be included because the market-maker has had an opportunity to manually intervene and modify his quotes. Thus, the aggregate risk measurement may be based on the last N trades, where N is a trading parameter specified by the market-maker, or may be based on trades occurring within a specific time frame. The duration of the time frame may be specified by the market-maker by providing a time window parameter $t_K$, which is included as a trading parameter. Alternatively, a default value for $t_K$ may be used.

Alternatively, the risk threshold and risk measurement may include an aggregate gamma measurement. Gamma is known to those of skill in the art to be the rate of change of the delta parameter with respect to the rate of change of the underlying security, such as the stock. An aggregate gamma measurement provides an indication of the rate at which an aggregate delta measurement will change. Net gamma values are negative when a market-maker is a net seller of contracts, and positive when a market-maker is a net buyer of contracts. As a further alternative, either theta, which is the rate at which option prices change over time, or vega, which is the change in an option contract that results from a change in its volatility, may be included.

The market-maker may provide a single threshold $\Delta_{NETMAX}$ such that if the absolute value of the aggregate risk exceeds the threshold, then the quotes are modified according to the rules set forth below. The market-maker may also provide positive and negative thresholds $\Delta^+_{NETMAX}$ and $\Delta^-_{NETMAX}$ to accommodate a market-maker's pre-existing risk bias.

In an alternative preferred embodiment, the market-maker's risk is determined by calculating the net contract volume traded within a specified time. The net contract volume $K_{NET}$ may be calculated by using equation (1) above, with the exception that the delta value is replaced by the sign of Δ, or ±1, where calls are positive 1, and puts are negative 1:

$$K_{NET} = \sum_i S_i \cdot \text{sign}(\Delta_i) \cdot U_i \cdot K_i, \text{ for each trade, } i. \quad (2)$$

The result is that the volume of each trade is treated as a positive or negative value, depending upon the nature of the trade—selling calls and buying puts have negative contributions, and buying calls and selling puts have positive contributions. The sum of the trades is then calculated to provide a net difference between the number of short calls plus long-puts and long calls plus short puts. Thus, the market-makers may specify a threshold in terms of a maximum net contract volume offset, $K_{NETMAX}$ (or positive and negative thresholds $K^+_{NETMAX}$ and $K^-_{NETMAX}$ to accommodate a market-maker's pre-existing risk bias). As stated above, the system may be configured to also allow the market-makers to specify a time window parameter $t_K$ that specifies which trades should be included in the risk calculation. Thus, only the contracts K that have been executed within the previous t seconds will be included in equation 2. Alternatively, the system may be configured to specify i, the number of previous trades to include in the risk calculation.

In still further embodiments, the aggregate risk measurement may be simplified by calculating the total number of put or call contracts (or deltas) that have been sold or bought within a given time frame or within that last N trades. Thus, for example, when a market-maker has just sold a put, the quote service module 240 may calculate the total number of puts sold (or the delta due to all the puts sold) within the given trading window and compare it to a threshold. If the next trade is a call purchase, then the system would calculate the contracts or deltas for the calls purchased. Thus, if any of the four aggregate volume quantities (buying calls, selling calls, buying puts, selling puts) exceeds a threshold (within a certain time period, or certain number of trades), the quote-modification module 340 modifies the quotes appropriately. Alternatively, the quote service module 240 may calculate the total calls bought plus puts sold, and the total calls sold plus puts bought, and notify the quote modification module 340 if either of these aggregate values exceeds the threshold. As a further alternative, the quote service module may use a weighting scheme to calculate aggregate values described above. Specifically, in-the-money options (options with intrinsic value) may be weighted more heavily than at-the-money or out-of-the-money options. In one preferred method, the in-the-money options are weighted with a factor of two, at-the-money options are weighted with a factor of one, and out-of-the-money options are weighted by a factor of one half. These simplified risk measurement and threshold tests perform adequately due to the nature of trading activities that typically result in large risk exposure.

It should also be noted that the market-makers may be grouped together for purposes of risk exposure analysis. That is, the total risk may be calculated based on the trades of one or more market-makers. The market-makers provide a group identification parameter(s) indicating which other market-makers' trades should be included in the risk calculation. In this manner, market-makers acting in concert on behalf of a single organization may coordinate their quote modification.

Automatic Quote Modification

The quote service module 240 of the exchange system 100 includes a quote modification service module 340. The quote modification service module 340 may be implemented as part of the quote service module 240, or may be a separate service module. It may also take the form of a separate quote factory module for generating new instantiations of quote objects. The quote modification service module 340 performs quote modification by preferably automatically revising, canceling, or regenerating quotes. The quote modification service module 340 resides on the exchange system computer 104, 106, or computer cluster 102. The quotes are modified by the exchange system in an automatic manner that does not require further input from the market-maker in the form of quote cancellation requests and submission of new quotes by the market-maker or his computer. In this way, the exchange system performs quote modification immediately and without the transmission delays inherent in communication systems and without delays associated with processing queued cancellation requests received from a remote location.

If the quote service module 240 determines that the threshold(s) have been exceeded, the quote service module 240 determines revised quotes and forwards them to the broker service module 230 and the quote objects 250, 252. The revised quotes can take numerous forms. In a first embodiment, the quote service module 240 revises quotes by cancelling all outstanding quotes in the class, thereby preventing any further trades from executing and giving the market-maker time to provide revised quotes. In this embodiment, the quote service module 240 sends quote update messages 290 in the form of cancellation messages to the broker service module 230. The broker service 230 then removes those quotes from the electronic book. Because the threshold test is performed by the exchange system 100 after each trade, the cancellation messages are therefore preferably processed before any further trades can be executed. This is possible because the cancellation requests are not sent from a remote node on a wide area network, such as a market-maker's computing platform, but are generated by the exchange system 100. This provides the advantage of eliminating a cancellation message queue, as would be used when sending cancellation requests from a remote node, thereby improving quote update times and providing risk management.

In a second embodiment, the quote service module 240 revises quotes by reducing the quantity associated with the existing quotes in the class thereby reducing the amounts of potential further trades and reducing the market-maker's exposure to more risk. The market-maker may specify the amount of the volume decrease by way of an increment value. In this embodiment, the quote service module 240 sends quote updates 290 by first sending quote cancellation messages to the broker service module 230, and after acknowledgment, sending the revised quotes to the broker service module 230 for execution or booking. Again, because the threshold test is performed by the exchange system 100 after each trade, the cancellation messages are therefore preferably processed before any further trades can be executed. As above, this is possible because the cancellation requests are not sent from a remote node on a wide area network, such as a market-maker's computing platform, but are generated by the exchange system 100.

In a third embodiment, the quote service module 240 revises quotes by decreasing the bid and offer values of some quotes and increasing others in an attempt to cancel some of the risk already assumed by the market-maker. The quote service 240 does this by automatically adjusting quotes to favor trades that will tend to provide offsetting risk. Specifically, if the threshold ($K_{NETMAX}$ or $\Delta_{NETMAX}$) has been exceeded by a high positive-valued net delta (or K), then the net delta (or K) may be offset by trades having a negative delta (or K). As set forth above, those trades would include selling calls and buying puts. Similarly, if the threshold has been exceeded by a high negative-valued net delta (or K), then the aggregate risk may be offset by trades having a positive delta (or K), or by selling puts and buying calls. Of course, to produce the desired trades, the lowering of offer values of quotes will tend to result in more selling activity by the market-maker, and the raising of bid values will result in more buying activity by the market-maker. In this embodiment, the modification increment is specified by an increment value. As in the previous embodiment, the quote service module 240 sends quote updates 290 by sending quote cancellation messages to the broker service module 230, and after acknowledgment, sending the revised quotes to the broker service module 230 for execution or booking. Again the automated risk monitoring system and quote modification service of system 100 provides advantages in that the market-maker need not cancel previous quotes and submit new quotes while still being exposed to the possibility of further trades being executed.

The quote service 240 may also modify quotes by regenerating the just-filled quote. This may be performed even if the market-maker's risk threshold has not been exceeded. The market-maker is able to specify quote regeneration parameters via client application server 210 that are stored in the user service module 260. The parameters specify which products are enabled for quote regeneration, and the extent to which the quotes are to be regenerated. The market-maker may therefore specify, on a product-by-product basis, how many times the quotes are to be regenerated after each quote has been filled. This is referred to herein as the regeneration number parameter. The market-maker may also specify whether the regenerated quotes are to have the same bid and offer values, or are to be backed-off from the previous trade. This parameter is referred to herein as the regeneration increment. That is, for a two-sided quote, if the market-maker has just sold a quantity of contracts at his offer price, the regenerated quote may have a higher offer value. Preferably the bid value is also raised accordingly to maintain a desired or required spread in bid and offer quotes. If, on the other hand, the market-maker has just bought a quantity of contracts at his bid price, the regenerated quote may have a lower bid value. The market-maker also has the option of specifying on a per-class basis the values of the regeneration number parameter and the regeneration increment parameter. The quote regeneration is preferably not performed if the market-maker risk threshold has been exceeded, unless the market-maker has specifically selected quote revision in the event the risk threshold has been exceeded.

Figure 4:
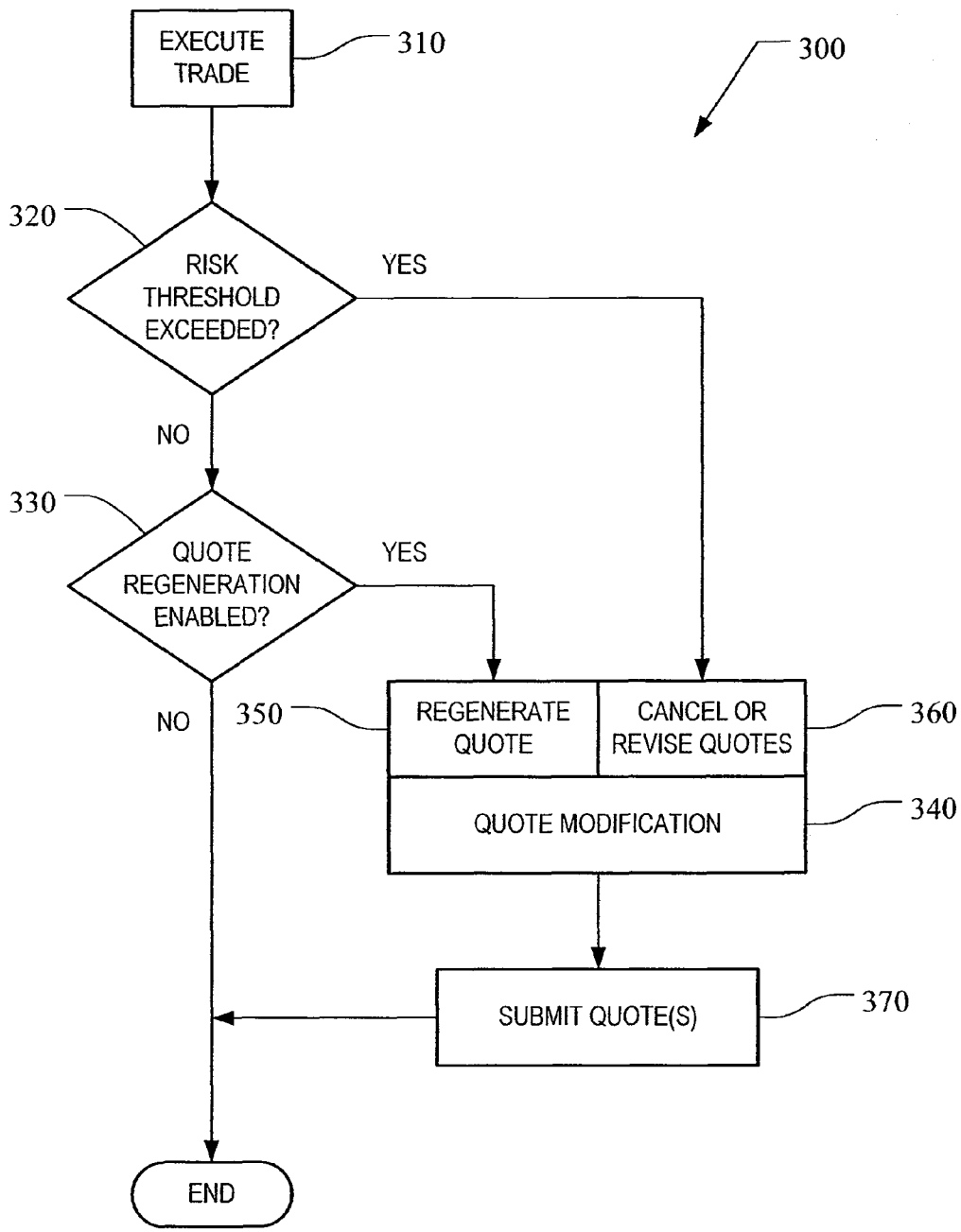
FIG. 4 shows a flowchart depicting the method of modifying quotes.

With reference to FIG. 4, the method of quote modification 300 will be described. Upon execution of a trade at step 310, the quote service module 240 at step 320 checks to see whether the individual market-maker's risk threshold has been exceeded. As mentioned above, the risk measurement and threshold test may be performed using a variety of methods, and certain market-makers' trading activities may be combined for the purposes of risk exposure. If the threshold has not been exceeded, then at step 330 the quote service module 240 preferably checks to see whether the market-maker whose quote has been executed has indicated the desire to have his quotes regenerated. If not, then the process has completed. In the event that the result of either inquiry 320, 330 is affirmative, then the quote service 240 modifies the quotes with the quote modification module 340 as described above.

Quote modification module 340 includes quote regeneration module 350 and cancel or revise quote module 360. As mentioned above, the quote modification module 340 may be integral to quote service module 240, or may be included in a quote factory module, or may be a separate service module. The quotes are regenerated, cancelled, or revised, for example as described above, and submitted as shown in step 370 to the broker service module 230 for execution.

Preferred embodiments of the present invention have been described herein. It is to be understood, of course, that changes and modifications may be made in the embodiments without departing from the true scope of the present invention, as defined by the appended claims. The present embodiment preferably includes logic to implement the described methods in software modules as a set of computer executable software instructions. A Central Processing Unit ("CPU"), or microprocessor, implements the logic that controls the operation of the transceiver. The microprocessor executes software that can be programmed by those of skill in the art to provide the described functionality.

The software can be represented as a sequence of binary bits maintained on a computer readable medium including magnetic disks, optical disks, and any other volatile or (e.g., Random Access memory ("RAM")) non-volatile firmware (e.g., Read Only Memory ("ROM")) storage system readable by the CPU. The memory locations where data bits are maintained also include physical locations that have particular electrical, magnetic, optical, or organic properties corresponding to the stored data bits. The software instructions are executed as data bits by the CPU with a memory system causing a transformation of the electrical signal representation, and the maintenance of data bits at memory locations in the memory system to thereby reconfigure or otherwise alter the unit's operation. The executable software code may implement, for example, the methods as described above.

It should be understood that the programs, processes, methods and apparatus described herein are not related or limited to any particular type of computer or network apparatus (hardware or software), unless indicated otherwise. Various types of general purpose or specialized computer apparatus or computing device may be used with or perform operations in accordance with the teachings described herein.

It should be understood that a hardware embodiment may take a variety of different forms. The hardware may be implemented as an integrated circuit with custom gate arrays or an application specific integrated circuit ("ASIC"). Of course, the embodiment may also be implemented with discrete hardware components and circuitry. In particular, it is understood that the logic structures and method steps described herein may be implemented in dedicated hardware such as an ASIC, or as program instructions carried out by a microprocessor or other computing device.

The claims should not be read as limited to the described order of elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A system for processing trades of securitized instruments based on security orders and quotes received from client computers, comprising:
    at least one server computer comprising a memory, and a processor, said server computer configured to perform the steps of:
        receiving orders and quotes, wherein specified ones of said quotes belong to a quote group, and wherein said specified ones of said quotes have associated trading parameters comprising a risk threshold;
        generating a trade by matching said received orders and quotes to previously received orders and quotes;
        storing each of said orders and quotes when a trade is not generated;
        determining whether a quote having associated trading parameters has been filled as a result of the generated trade, and if so, determining a risk level and an aggregate risk level associated with said trade;
        comparing said aggregate risk level with said risk threshold; and,
        automatically modifying at least one of the remaining specified ones of said quotes in the quote group if said threshold is exceeded.

2. The apparatus of claim 1 further comprising a quote data structure stored in said first memory, said data structure containing a plurality of quotes fields and at least one risk threshold field.

3. The apparatus of claim 2, wherein said plurality of quote fields comprises a bid quote field and an offer quote field.

4. The apparatus of claim 2, wherein said data structure further comprises a group indicator field.

5. The apparatus of claim 2, wherein said data structure further comprises a quote modification increment field.

6. The apparatus of claim 2, wherein said data structure further comprises a quote regeneration increment field.

7. The apparatus of claim 2, wherein said data structure further comprises an owner field.

* * * * *